(12) United States Patent
King et al.

(10) Patent No.: US 6,854,071 B2
(45) Date of Patent: Feb. 8, 2005

(54) METHOD AND APPARATUS FOR PROVIDING WRITE RECOVERY OF FAULTY DATA IN A NON-REDUNDANT RAID SYSTEM

(75) Inventors: Allen King, San Jose, CA (US); Michael Attmer Lynch, Jr., Hayward, CA (US)

(73) Assignee: International Business Machines Corporation, Armonk, NY (US)

( * ) Notice: Subject to any disclaimer, the term of this patent is extended or adjusted under 35 U.S.C. 154(b) by 632 days.

(21) Appl. No.: 09/854,543

(22) Filed: May 14, 2001

(65) Prior Publication Data

US 2002/0169996 A1 Nov. 14, 2002

(51) Int. Cl.[7] .............................................. G06F 11/00
(52) U.S. Cl. ........................ 714/8; 714/54; 369/53.35
(58) Field of Search ................ 714/7, 8, 54; 369/53.36, 369/53.35, 47.14, 53.15

(56) References Cited

U.S. PATENT DOCUMENTS

| | | |
|---|---|---|
| 5,278,838 A | 1/1994 | Ng et al. |
| 5,313,626 A | 5/1994 | Jones et al. |
| 5,598,549 A | 1/1997 | Rathunde |
| 5,615,190 A | 3/1997 | Best et al. |
| 5,721,816 A | 2/1998 | Kusbel et al. |
| 5,774,643 A | 6/1998 | Lubbers et al. |
| 5,913,927 A | 6/1999 | Nagaraj et al. |
| 5,918,001 A | 6/1999 | Ueno et al. |
| 5,941,998 A * | 8/1999 | Tillson ......................... 714/54 |
| 5,948,110 A | 9/1999 | Hitz et al. |
| 5,961,652 A | 10/1999 | Thompson |
| 5,974,544 A | 10/1999 | Jeffries et al. |
| 6,014,755 A * | 1/2000 | Wells et al. ..................... 714/8 |
| 6,018,778 A | 1/2000 | Stolowitz |
| 6,052,797 A | 4/2000 | Ofek et al. |
| 6,327,106 B1 * | 12/2001 | Rothberg ...................... 360/53 |
| 6,384,999 B1 * | 5/2002 | Schibilla ....................... 360/53 |
| 6,539,496 B1 * | 3/2003 | Peters et al. ..................... 714/8 |

* cited by examiner

Primary Examiner—Robert Beausoliel
Assistant Examiner—Marc Duncan
(74) Attorney, Agent, or Firm—David W. Lynch; Arthur J. Samodovitz

(57) ABSTRACT

A table for identifying potentially bad location addresses based on prior knowledge and performing specific operations using the table data to ensure write recovery is disclosed. A Write Recovery Table (WRT) is provided, which consists of a list of LBAs requiring such special write recovery action so that a WRITE AND VERIFY command is issued instead of a WRITE command. If the WRITE AND VERIFY command fails, the RAID controller can issue a REASSIGN BLOCKS command for the bad block and re-issue the WRITE AND VERIFY command. If WRITE AND VERIFY commands are not supported, then the system can use a READ command with the "Force Unit Access" flag bit being set to "1" to verify the written data. Further, the WRT may be combined with Bad Data Table (BDT) to reject a Read Request from the host for a matched LBA (that is listed therein) because the data in the addressed block is known incorrect when a write recovery action is not warranted.

21 Claims, 13 Drawing Sheets

| LBA (hex) | Write Recovery bit | Explanation |
|---|---|---|
| 00 00 A2 C0 | 1 | Had a read error, req'ing write recovery on write, cleared after |
| 01 24 60 3B | 0 | Known bad data, read error status to host; cleared on write |
| FF FF FF FF | 0 | Not a valid entry |

Fig. 5

METHOD AND APPARATUS FOR PROVIDING WRITE RECOVERY OF FAULTY DATA IN A NON-REDUNDANT RAID SYSTEM

BACKGROUND OF THE INVENTION

1. Field of the Invention

This invention relates in general to fault tolerant arrays of hard disks that are known as redundant arrays of inexpensive disks (RAID), and more particularly to a method and apparatus for providing write recovery of faulty data in a non-redundant array disk system.

2. Description of Related Art

Modern mass storage subsystems are continuing to provide increasing storage capacities to fulfill user demands from host computer system applications. Further, it is very important that a computer storage system perform reliably. For example, some real time computer storage systems are used to control complex and sometimes dangerous production processes. Failure within storage systems of this type may have adverse consequences both for the products being produced as well as for the health and safety of the surrounding environment. As another example, computer storage systems are often used in mission critical roles. Once again, failure within these types of storage systems may have extremely serious consequences. Of course, even in cases where the failure of a computer system is not dangerous, failure may still be inconvenient and/or expensive.

Various storage device configurations and geometries are commonly applied to meet the demands for higher storage capacity while maintaining or enhancing reliability of the mass storage subsystems. A popular solution to these mass storage demands for increased capacity and reliability is the use of multiple smaller storage modules configured in geometries that permit redundancy of stored data to assure data integrity in case of various failures. In many such redundant subsystems, recovery from many common failures can be automated within the storage subsystem itself due to the use of data redundancy, error codes, and so-called "hot spares" (extra storage modules which may be activated to replace a failed, previously active storage module). These subsystems are typically referred to as redundant arrays of inexpensive (or independent) disks (or more commonly by the acronym RAID). The 1987 publication by David A. Patterson, et al., from University of California at Berkeley entitled A Case for Redundant Arrays of Inexpensive Disks (RAID), reviews the fundamental concepts of RAID technology.

There are several "levels" of standard geometries defined in the Patterson publication. RAID 0 offers disk striping without parity. The multiple disks provide quick reads and writes for large files without the data redundancy protection provided by parity. However, Level 0 is not considered true RAID. A RAID level 1 system, comprises one or more disks for storing data and an equal number of additional "mirror" disks for storing copies of the information written to the data disks. Subsequent RAID levels, e.g., RAID 2, 3, 4 and 5 segment the data into portions for storage across several data disks. One or more additional disks are utilized to store error check or parity information. RAID Level 6 is like RAID 5 but with additional parity information written that permits data recovery if two drives fail. This configuration requires extra parity drives, and write performance is slower than a similar implementation of RAID 5. Some RAID implementations use different levels on separate banks of drives in an attempt to provide better overall application performance on the Host system. While this approach can provide some performance benefits, it raises the complexity of data management, and creates the possibility of large performance and/or cost penalties when data sets optimized for one level must be relocated to a different level when the capacity of a given bank is exceeded. Many other varieties of RAID levels exist, with many being proprietary. Yet, the general aspect of providing protection against storage system failures is the goal.

RAID storage subsystems typically utilize an array controller that shields the user or host system from the details of managing the redundant array. The controller makes the subsystem appear to the host computer as one (or more), highly reliable, high capacity disk drive. In fact, the RAID controller may distribute the host computer system supplied data across a plurality of the small independent drives with redundancy and error checking information so as to improve subsystem reliability. Frequently RAID subsystems provide large cache memory structures to further improve the performance of the RAID subsystem. The cache memory is associated with the control module such that the storage blocks on the disk array are mapped to blocks in the cache. This mapping is also transparent to the host system. The host system simply requests blocks of data to be read or written and the RAID controller manipulates the disk array and cache memory as required.

Each of these configurations (geometries or RAID levels) may be preferred over the others in particular applications depending upon performance or reliability requirements. It is vital to proper operation of the RAID storage subsystem that the configuration information be maintained. Each disk drive of the disk array must be in a known address and/or physical position with respect to the various interface and control busses. The order of the various disk drives in their respective groupings is critical to proper operation of the RAID subsystem. Furthermore, many RAID storage subsystems permit a plurality of groupings of disk drives to be simultaneously operable within the subsystem. Each grouping may be operating under a different RAID geometry to satisfy the needs of a particular application.

Initial implementations of RAID were in the form of software device drivers that had to be added to the host computer system. It quickly became apparent that the overhead involved in managing the RAID was significant, and made the computer run much slower. Because storage demands weigh heavily on a processor, executing all the read and write operations on the disk system results in a huge number of I/O interrupts. If these were to be processed by a host CPU, then the host would be doing little else. To ease this burden, storage vendors and motherboard designers have contemplated alternative methods of processing I/O.

One alternative to host based I/O control is to implement an I/O processor directly on the storage controller to handle most of the I/O to its connected drives. This is called a controller-based RAID. In the host-based I/O control, all the RAID functions are handled directly by the file system and device drivers of the host operating system. However, with a RAID controller, most of the RAID functions are passed on to the RAID controller to manage. There is still I/O between the host CPU and the controller, but a significant portion of this is reduced with controller-based systems. This hardware RAID controller concept provides greater performance while maintaining all the benefits of the RAID technology. Thus, a RAID controller organizes the disk drives into the RAID configuration and controls the interaction between the individual disk drives.

As generally described above, a RAID system may consist of a host, a RAID controller, and non-redundant RAID array(s) and/or redundant RAID array(s). Data transfer between the host and any such array is initiated via a host Read Request or Write Request. A host Read or Write Request causes a READ or WRITE command, respectively, to be issued by the RAID controller to one or more disks (built to SCSI interface, for example) in a designated array.

When the command is completed normally (with no error), the drive returns a GOOD completion status (or, simply status) to the RAID controller, which in turn presents a Good status to the host. A write operation is generally assumed successful if the disk receiving the WRITE command returns a Good status after it is executed. Even though no write error occurred at a certain data block location on the disk, a subsequent read operation at that block may or may not be successful.

For a redundant RAID configuration, when an unreadable data block is discovered, the RAID controller generally attempts to retry the read, and if it is unsuccessful, the RAID controller tries to re-write the block with data regenerated from the member drives (as in a RAID 5) or from the mirrored copy (as in a RAID 1 or RAID 6). After the write, data is verified with a READ command with the FUA (Force Unit Access) bit being set to "1", indicating that data must be read from the media. If the re-write is not successful, a block reassignment is attempted. However, this error recovery procedure is not used for a non-redundant array or a redundant array having one drive offline since "replacement" data is not available during a read operation.

When a data block needs to be updated, a WRITE command is issued, without prior knowledge that the block on the disk may have been determined by the disk as unreadable and re-writing it may or may not solve the problem. In the latter case, a relocation on the disk may have been recommended by the disk. On a Write Request, the controller will issue a WRITE command to the disk as usual. Unless a write error occurs, the controller will not verify the data or perform a block reassignment. Consequently, the data may remain unreadable at the same physical location.

There are disks on which a write operation may not end up with any error indication, but reading the data cannot be successful. For example, the disk may use a No-IDTM architecture, and as a result, write errors do not usually occur (other than a possible "No Sector Found" error). However, when an unrecovered read error occurs, the controller is not able to re-write or relocate data with a non-redundant RAID array because of the absence of replacement data. Therefore, in some cases, data at a faulty location may never be recovered even when replacement (or updated) data becomes available for a write or relocate operation.

It can be seen that there is a need for a method and apparatus for write recovery of faulty data in a non-redundant array disk system.

SUMMARY OF THE INVENTION

To overcome the limitations in the prior art described above, and to overcome other limitations that will become apparent upon reading and understanding the present specification, the present invention discloses a method and apparatus for write recovery of faulty data in a non-redundant array disk system.

The present invention solves the above-described problems by providing using a table for identifying potentially bad location addresses based on past read experience and performing specific operations using the table data to ensure write recovery.

A method in accordance with the principles of the present invention includes issuing a command to write and verify data transfer when requested to write data to a specified location address that is stored in an error table and reassigning the data to a new location address when the command to write and verify the data transfer is unsuccessful.

Other embodiments of a method in accordance with the principles of the invention may include alternative or optional additional aspects. One such aspect of the present invention is that the error table records error locations on a disk drive.

Another aspect of the present invention is that the method further includes transferring the data to the specified location address when a good status is returned in response to the command to write and verify the data transfer.

Another aspect of the present invention is that the error table comprises a write recovery table.

Another aspect of the present invention is that the error table comprises a combined write recovery table and bad data table.

Another aspect of the present invention is that the command to write and verify the data transfer comprises a write/verify command.

Another aspect of the present invention is that the command to write and verify the data transfer comprises a write command followed by a read command with the force unit access bit being set to 1 to force the data to be read from the disk drive media rather than from disk drive cache.

Another aspect of the present invention is that the command to write and verify the data transfer is unsuccessful only when a predetermined number of write and verify retries is exhausted.

Another aspect of the present invention is that the method further includes verifying the reassigning of data to a new location address, detecting an error for the reassigning, retrying the reassigning for a predetermined number of times and returning a fatal error status and marking the disk offline when the predetermined number of times is exhausted.

Another aspect of the present invention is that the method further includes deleting the specified location address that is stored in the error table when the reassign of data is successful.

Another aspect of the present invention is that the method further includes deleting the specified location address that is stored in the error table when the command to write and verify the data transfer is successful.

In another embodiment of the present invention, a storage system is disclosed. The storage system includes an array of storage devices and a storage controller, coupled to the array of storage devices, the storage controller including a memory for maintaining an error table, the storage controller further being configured to issue a command to write and verify data transfer when requested to write data to a specified location address that is stored in an error table and reassign the data to a new location address when the command to write and verify the data transfer is unsuccessful.

Another aspect of the present invention is that the error table records data error locations on a disk drive.

Another aspect of the present invention is that the controller transfers the data to the specified location address when a good status is returned in response to the command to write and verify the data transfer.

Another aspect of the present invention is that the error table comprises a write recovery table.

Another aspect of the present invention is that the error table comprises a combined write recovery table and bad data table.

Another aspect of the present invention is that the command to write and verify the data transfer comprises a write/verify command.

Another aspect of the present invention is that the command to write and verify the data transfer comprises a write command followed by a read command with the force unit access bit being set to 1 to force the data to be read from the storage device rather than from cache of the storage controller.

Another aspect of the present invention is that the command to write and verify the data transfer is unsuccessful only when a predetermined number of write and verify retries is exhausted.

Another aspect of the present invention is that the storage controller further verifies the reassigning of data to a new location address, detects an error for the reassigning, retries the reassigning for a predetermined number of times, returns a fatal error status and marks the storage device offline when the predetermined number of times is exhausted.

Another aspect of the present invention is that the storage controller deletes the specified location address that is stored in the error table when the reassign of data is successful.

Another aspect of the present invention is that the storage controller deletes the specified location address that is stored in the error table when the command to write and verify the data transfer is successful.

In another embodiment of the present invention, an error table is disclosed. The error table is disposed in a storage controller, the error table configured with addresses for data error locations on a storage device so that for a write request, the storage controller knows to perform a write and verify command to transfer the data to the storage device and to verify the successful transfer of the data to the storage device.

Another aspect of the present invention is that the error table further includes a write recovery bit to indicate when an address associate therewith requires a write recovery during a write.

Another aspect of the present invention is that the write recovery bit allows a bad data table to be combined with the write recovery table.

Another aspect of the present invention is that, on a read, the error table is searched only for an address specified in a read request together with an associated write recovery bit being set to 0.

In another embodiment of the present invention, a memory is disclosed. The memory is configured for storing an error table and data fields, the error table comprising a non-volatile array configuration information storage area.

In another embodiment of the present invention, an article of manufacture is disclosed that includes a program storage medium readable by a computer. The medium tangibly embodies one or more programs of instructions executable by the computer to perform a method for handling write errors in a non-redundant disk array storage system, wherein the method includes issuing a command to write and verify data transfer when requested to write data to a specified location address that is stored in an error table and reassigning the data to a new location address when the command to write and verify the data transfer is unsuccessful.

In another embodiment of the present invention, a method for handling write errors in a non-redundant disk array storage system is disclosed. The method includes recording read error locations in an error table, issuing a command to write and verify data transfer when requested to write data to a specified location address that is stored in the error table and reassigning the data to a new location address when the command to write and verify the data transfer is unsuccessful.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout:

FIGS. 4a–e illustrate the process for providing write recovery of faulty data in a non-redundant array disk system according to the present invention;

FIG. 5 illustrates a combined table that is referred to as Write Recovery-Bad data Table (WR-BDT) according to the present invention;

DETAILED DESCRIPTION OF THE INVENTION

In the following description of the exemplary embodiment, reference is made to the accompanying drawings which form a part hereof, and in which is shown by way of illustration of the specific embodiment in which the invention may be practiced. It is to be understood that other embodiments may be utilized as structural changes may be made without departing from the scope of the present invention.

The present invention provides a table for identifying potentially bad location addresses and performing specific operations using the table data to ensure write recovery. A Write Recovery Table (WRT) is provided, which consists of a list of LBAs requiring such special write recovery action. The WRT provides prior knowledge that data at certain disk location needs special attention upon a write opportunity such as re-write, verify or reassign, so that faulty data at a certain disk location can be properly restored to be good, possibly at an alternate location. Therefore, permanent data loss can be avoided. The present invention achieves that by remembering the bad block address and force a WRITE AND VERIFY command to be issued instead of a WRITE command. If the WRITE AND VERIFY command fails, the RAID controller can issue a REASSIGN BLOCKS command for the bad block and re-issue the WRITE AND VERIFY command. If WRITE AND VERIFY commands are not supported, then the system can use a READ command with the "Force Unit Access" flag bit being set to "1" to verify the written data. Further, the WRT may be combined with Bad Data Table (BDT) to reject a Read Request from the host for a matched LBA (that is listed therein) because the data in the addressed block is known incorrect (it is a filler block) when the Write Recovery bit is set to 0.

Figure 1:
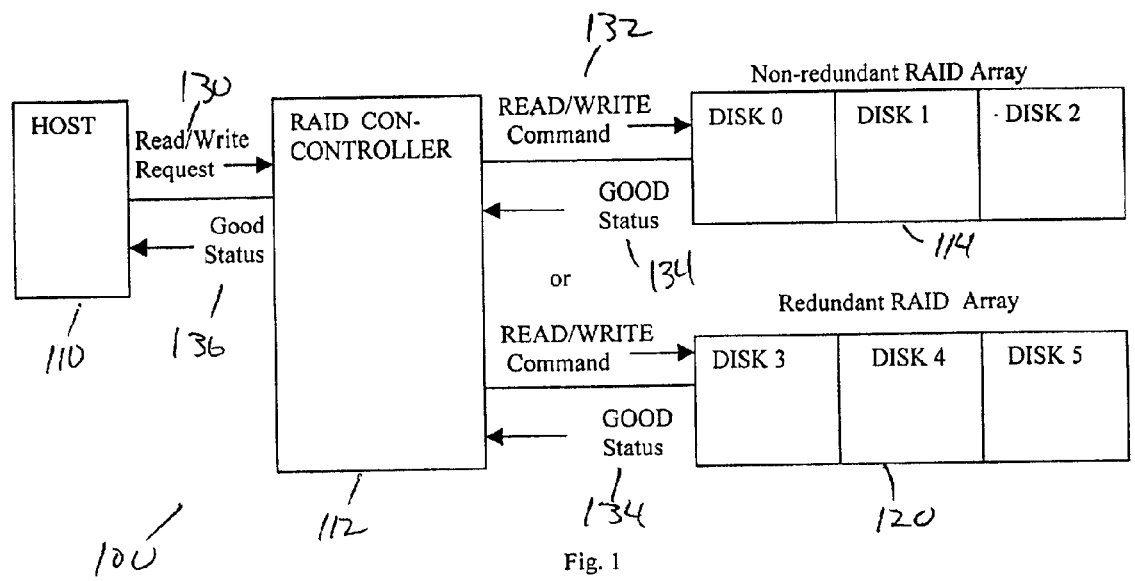
FIG. 1 illustrates an exemplary RAID system.

FIG. 1 illustrates an exemplary RAID system 100. The RAID system 100 may consist of a host 110, a RAID controller 112, and non-redundant RAID array(s) 114 and/or redundant RAID array(s) 120. Data transfer between the host 110 and any such array is initiated via a host Read Request or Write Request 130. A host Read or Write Request 130 causes a READ or WRITE command 132, respectively, to be issued by the RAID controller 112 to one or more disks (built to SCSI interface, for example) in a designated array 114, 120. When the command 132 is completed normally (with no error), the array 114, 120 returns a GOOD completion status 134 (or, simply status) to the RAID controller 112, which in turn presents a Good status 136 to the host 110. A write operation is generally assumed successful if the disk receiving the WRITE command returns a Good status after it is executed. However, even though no write error occurred at a certain data block location on the disk, a subsequent read operation at that block may or may not be successful.

During a read operation in a non-redundant RAID array such as RAID 0 or a critical redundant RAID array (such a RAID 5 with one member drive being offline), the array 114, 120 may encounter an unrecovered medium error. After exhausting its read recovery action, the array 114, 120 may recommend that the RAID controller 112 perform a rewrite operation for the block in error. Or, if necessary, the array 114, 120 may recommend that the RAID controller 112 perform a relocation of that data block to another physical location on the array 114, 120 (because it has determined that re-writing data at the same location may be futile).

Figure 2A:
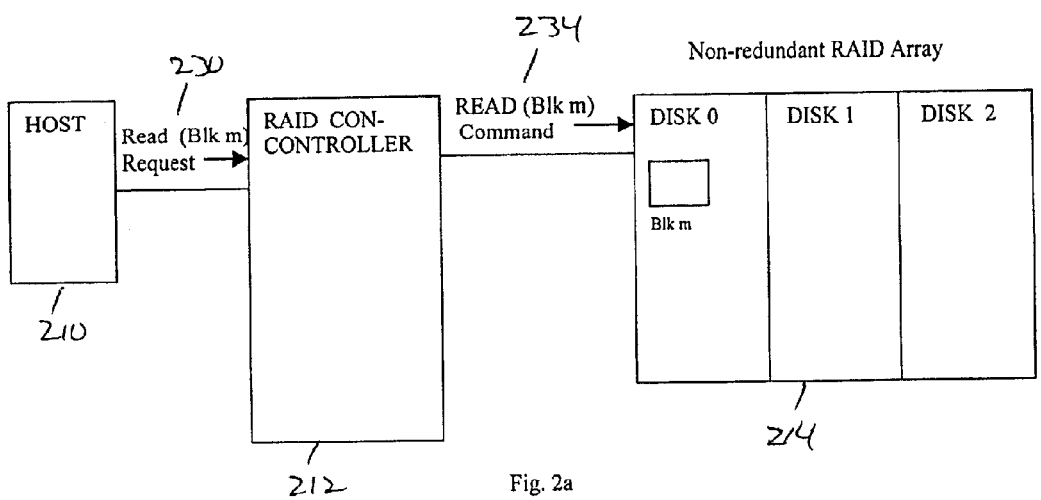
FIGS. 2a–b illustrate an unsuccessful read operation on certain blocks of data.
Figure 2B:
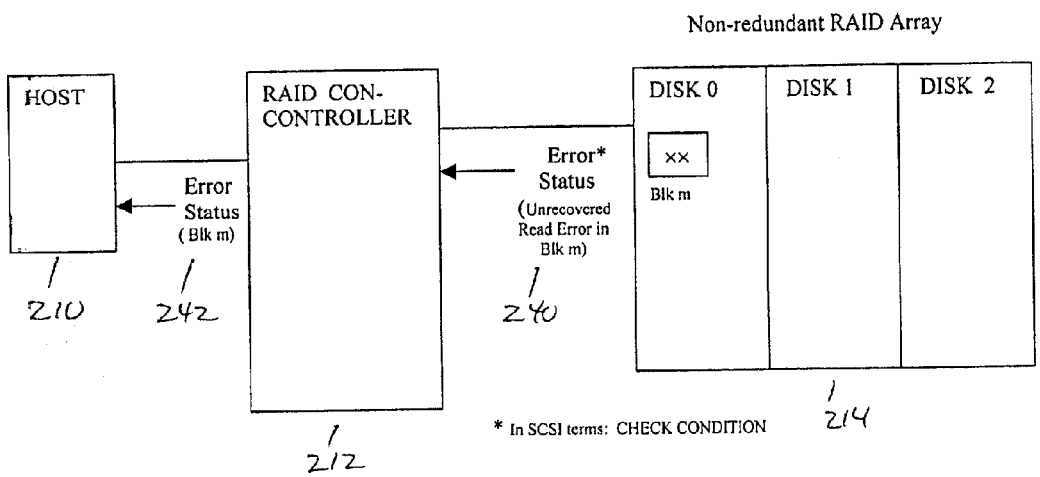

Unlike the case of a redundant array, replacement data is generally unavailable to the RAID controller during a read of the non-redundant array. FIGS. 2a–b illustrate an unsuccessful read operation on certain block such as designated block m (that is, the Logical Block Address (LBA) of the data block is m). In FIG. 2a, a Read request 230 is issued from the host 210 to the RAID controller 212. In response, the RAID controller 212 issues a Read command 234 to read Block m in the non-redundant RAID array 214. In FIG. 2b, an unrecovered read error 240 in block m is returned to the RAID controller 212. The RAID controller 212 then returns a block m error status 242 to the host 210.

Herein, a non-redundant RAID array is defined as a RAID array originally configured with no redundancy, such as a RAID 0, or as an originally configured redundant RAID array, such as a RAID 5, that somehow ends up with one member drive being offline and does not have a rebuild action to occur. When an unrecovered read error occurs on a non-redundant array, an error status is returned to the host through the RAID controller. On a subsequent Write Request, the RAID controller will issue a WRITE command to the disk as usual. If there is no write error, the data written is assumed to be readable. Because of a bad sector on the disk, this process may just repeat.

As will be shown with reference to FIGS. 4a–e below, the present invention provides a Write Recovery Table (WRT) (not shown), for example, in the RAID controller 212 in FIG. 2b, to provide prior knowledge that data at certain disk location needs special attention upon a write opportunity to provide faulty data recovery.

Figure 3A:
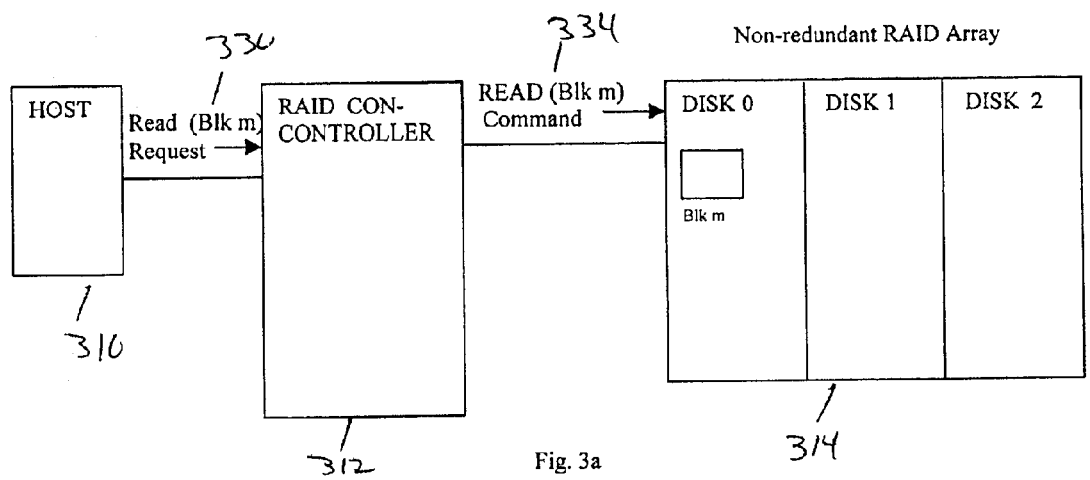
FIGS. 3a–d illustrate the problem of a write operation that does not produce any error indication, yet reading the data from the address cannot be performed successfully.
Figure 3B:
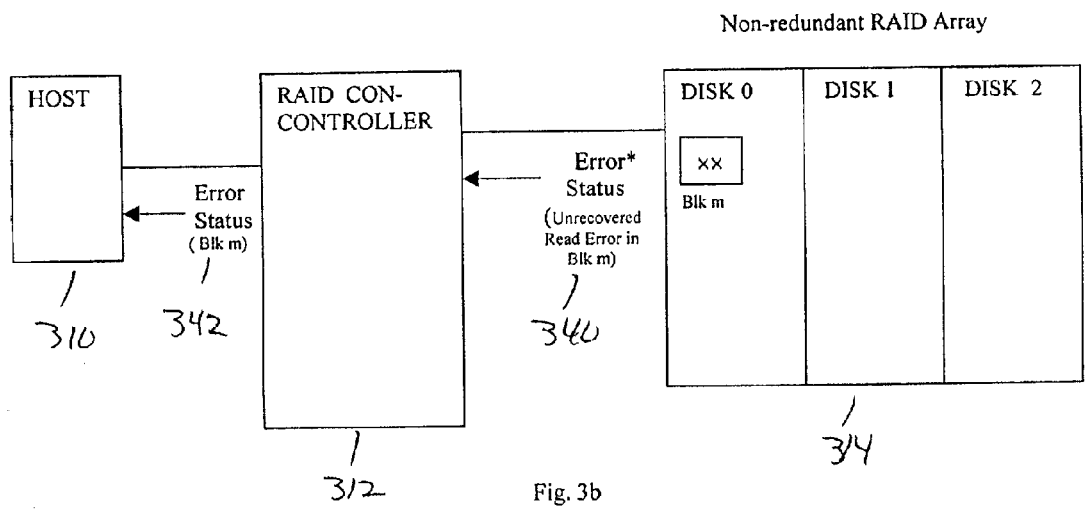
Figure 3C:
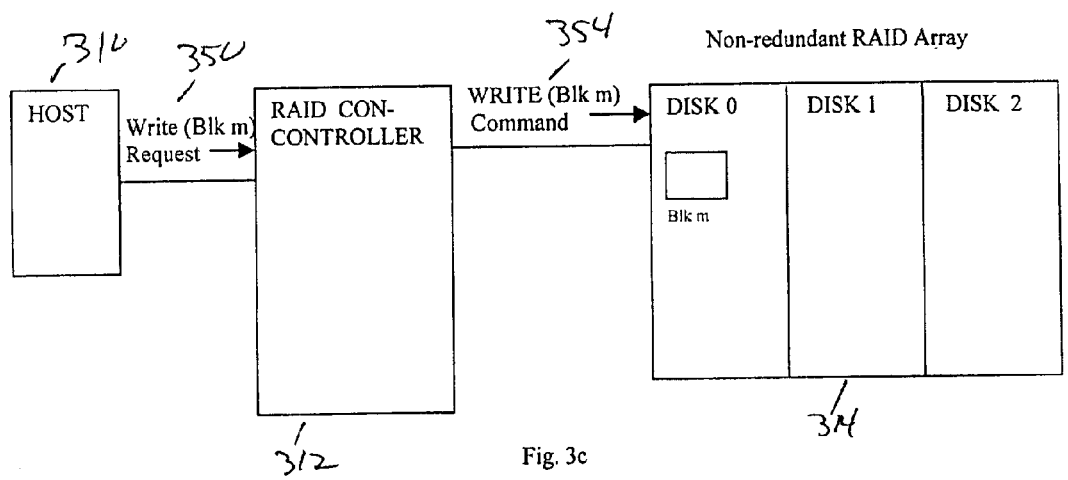
Figure 3D:
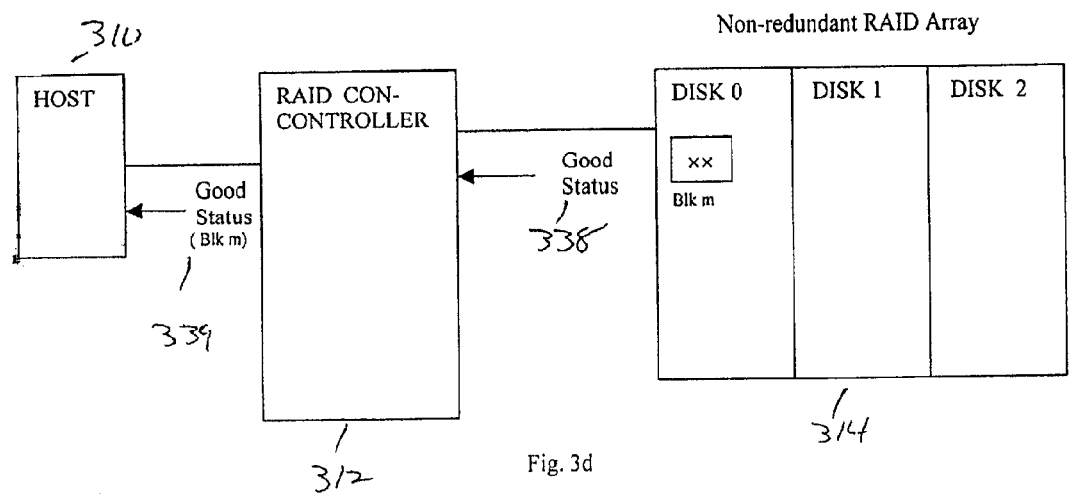

FIGS. 3a–d illustrate the problem of a write operation that does not produce any error indication, yet reading the data from the address cannot be performed successfully. In FIG. 3a a Read request 330 is issued from the host 310 to read Block m 334 in the non-redundant RAID array 314. FIG. 3b shows an unrecovered read error in block m 340 causing an error status 342 to be presented to host 310. FIG. 3c shows a Write Request 350 issued from the host 310 to write Block m 354 in the non-redundant RAID array 314. FIG. 3d shows a good status 338 being returned to the RAID controller 312, which returns Good status 339 to the host 310 when the write is completed at the non-redundant RAID array 314 with no write error.

According to prior systems, a write recovery is performed only if a write error condition is flagged by the disk during a write operation. This write recovery procedure consists of a write retry and verification of the written data via a READ command with the "Force Unit Access" flag bit being set to "1". If the data verification fails, a block reassignment is made and the WRITE and READ procedure is repeated. A typical user cannot then recover from a repetitive read error at the same location. If multiple data copies exist, the user may scrap the file containing the error, and access only an alternative copy. However, when an unrecovered read error occurs, the controller is not able to re-write or relocate data with a non-redundant RAID array because of the absence of replacement data. Therefore, in some cases, data at a faulty location may never be recovered even when replacement (or updated) data becomes available for a write or relocate operation.

Figure 4A:
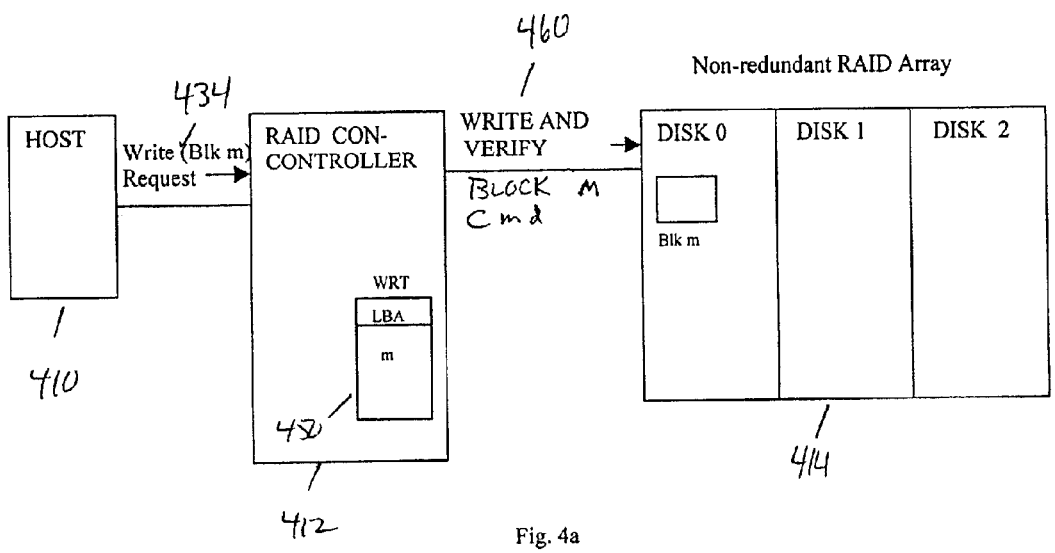

FIGS. 4a–e illustrate the process for providing write recovery of faulty data in a non-redundant array disk system according to the present invention. In FIG. 4a, a Write Request 434 for Block m is issued by the host 410. According to the present invention, a Write Recovery Table (WRT) 450 is provided, for example, in the RAID controller 412. The WRT 450 includes a list of LBAs requiring such special write recovery action. Accordingly, the WRT table 450 provides prior knowledge that data at certain disk location needs special attention upon a write opportunity such as rewrite, verify or reassign, so that faulty data at a certain disk location can be properly restored to be good, possibly at an alternate location.

Figure 4B:
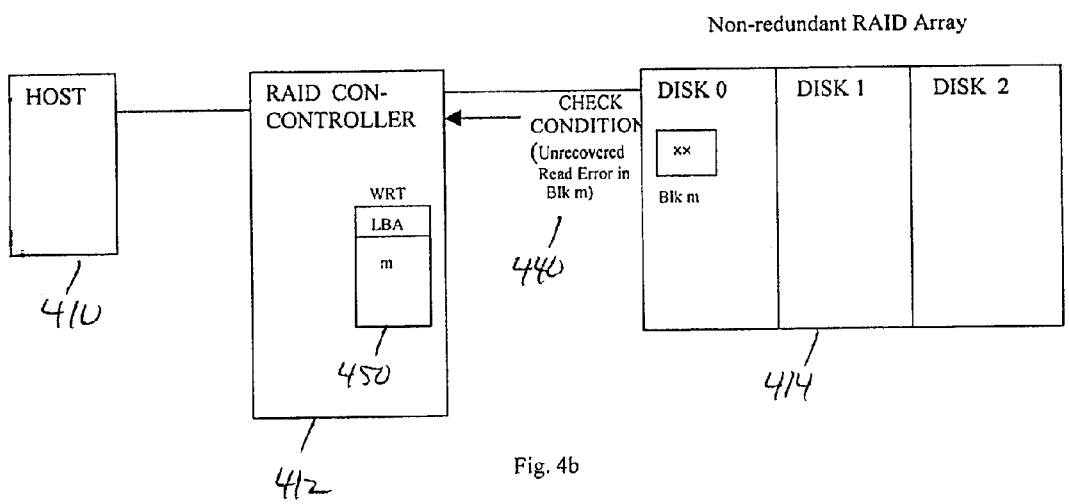
Figure 4C:
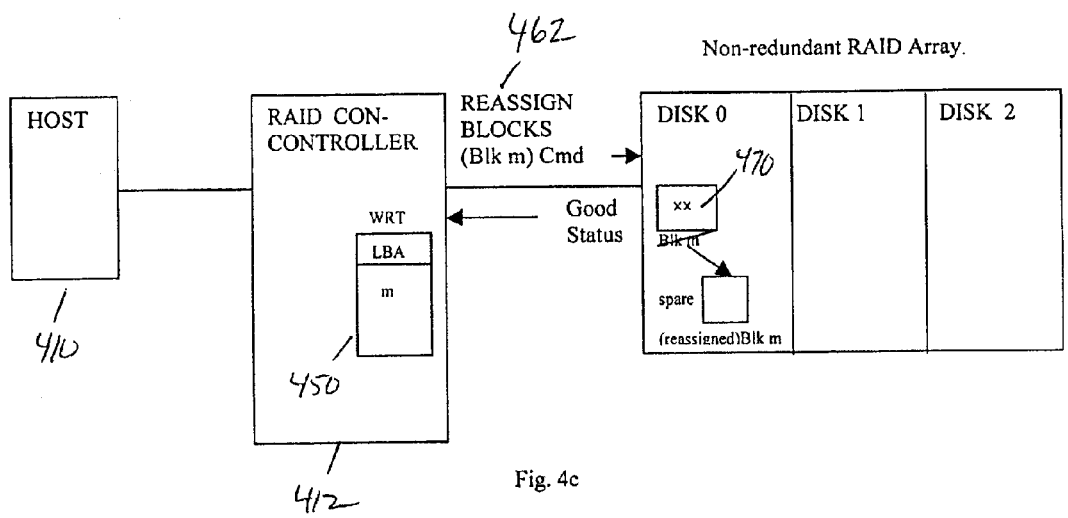
Figure 4D:
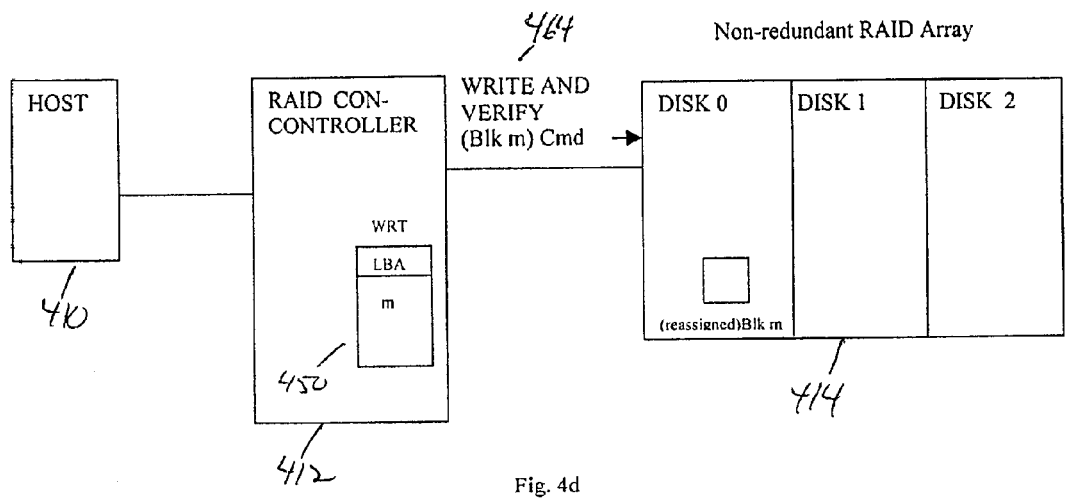
Figure 4C:
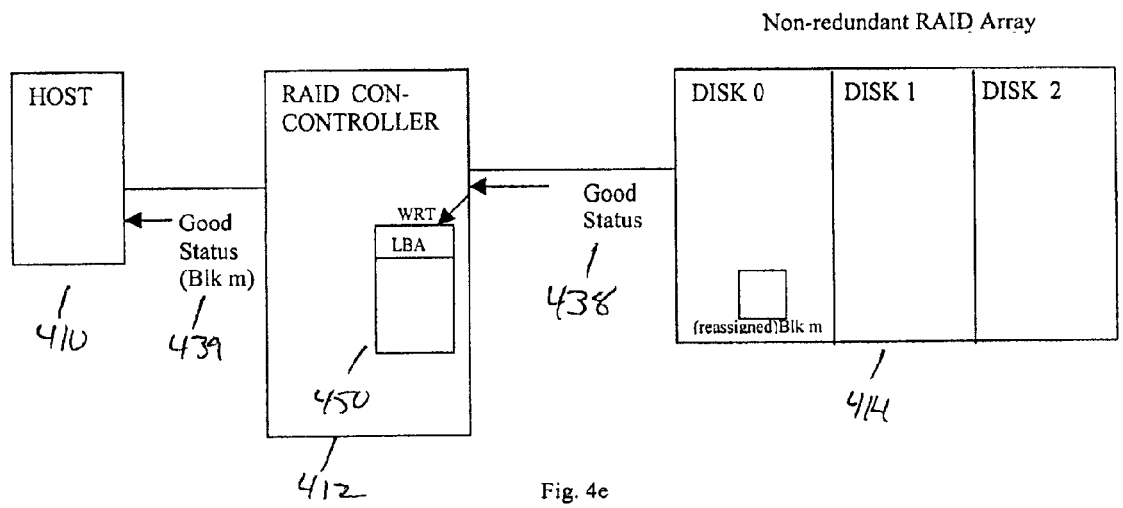

The WRT 450 provides a means of remembering the Logical Block Address (LBA) of the faulty block for the logical drive executing a READ command so that when the next write opportunity occurs, the faulty block may be specially treated for error recovery. The WRT 450 remembers a bad block address m and force a WRITE AND VERIFY command for block m 460 to be issued to the non-redundant RAID array 414 instead of a WRITE command. In FIG. 4b, a possible occurrence of unrecovered read error 440 in Block m in the verify portion of the WRITE AND VERIFY command is returned to the RAID controller 412. FIG. 4c shows the RAID controller 412 issuing a command for reassignment 462 of Block m to a spare physical sector by the array. FIG. 4c shows the reassignment of Block m 470 to a spare physical sector. FIG. 4d shows a subsequent WRITE AND VERIFY command 464 being re-issued to block m after a reassignment of the physical location was made. FIG. 4e shows the return of Good status 438 after the subsequent WRITE AND VERIFY command 464 indicating a successful completion of the WRITE AND VERIFY command. The entry from the Write Recovery Table 450 is removed.

The special treatment provided by the present invention starts, as illustrated in FIG. 4a, with a WRITE AND VERIFY command 460 issued by the RAID controller 412 for that particular LBA, as defined by the SCSI architecture. If the disk returns an error status known as CHECK CONDITION 440, e.g., in SCSI terms, the RAID controller initiates a block reassignment to an alternate physical disk location by issuing a REASSIN BLOCKS 462 for the block in error. Afterwards, the RAID controller re-issues the WRITE AND VERIFY command 464 for the block. Note that in the absence of a CHECK CONDITION 440, the original write and verify operation proceeds to its normal completion point and no block reassignment is performed. The entry in the WRT for Block m is then deleted.

Like the WRITE command, the initial WRITE AND VERIFY command 460 is used by the RAID controller 412 to access disk blocks and transfer data from the host 410 to those blocks. Additionally, the subsequent WRITE AND VERIFY commands 464 requests the array 414 to verify that data is written correctly on the media after the write operation. An error condition other than the indication of ILLEGAL REQUEST in case that the disk does not support the command, since it is an optional command, may indicate that a data block was not properly written.

The RAID controller 412 may, at its option, retry the WRITE AND VERIFY command 460 a certain number of times first, and then if the error condition persists, it will start a block relocation 462. A block relocation consists of a REASSIGN BLOCKS command 462 specifying the LBA of the block in error and a subsequent WRITE AND VERIFY command 464 in that order. A Good status 439 is returned to the host 410 and the associated entry in the Write Recovery Table 450 is deleted when the subsequent WRITE AND VERIFY command 464 for the requested block is successful.

The WRITE AND VERIFY commands 460, 464 override use of any enabled disk write cache to ensure data is written on the medium before having the disk return a completion status. Note that with a conventional WRITE command, the disk with write cache being enabled may return a GOOD status before data is written to the medium; if a recovered write error occurs later during writing on the disk, a deferred error may be returned. This may run into data integrity problem.

Further, those skilled in the art will recognize that for a multi-block write operation, the invention allows that the use of one WRITE AND VERIFY command 460, 464 to specify multiple blocks, instead of breaking the write into three segments: use the WRITE command for all blocks up to the block in error as per the WRT, use the WRITE AND VERIFY command 460, 464 for the block requiring write recovery and then use the WRITE command for the remaining blocks.

Support for the WRITE AND VERIFY command 460, 464 by contemporary disks is more a rule than an exception. Even though locating a disk that does not support such command is rather difficult at the present time, the present invention allows an alternative: a WRITE command followed by a READ command with the "FORCE UNIT ACCESS" (FUA) bit being set to "1", which forces the disk to read data from the medium rather than from a disk cache. Note that for redundant RAID arrays, this procedure is already used to verify that data is written correctly in a write recovery routine after a read error is determined to be unrecoverable. The data to be re-written is either regenerated from the member disks or from the mirrored copy, whichever applies.

The present invention provides a write recovery of a persistent unrecovered read error in a non-redundant RAID array 414 that is transparent to the using system. The host 410 can do business as usual when it comes to read or write data, regardless of errors encountered during the execution of the request. As defined above, a non-redundant RAID array 414 includes not only the originally configured RAID array that has no redundancy built in such as a RAID 0 array, but also a redundant RAID array that has one offline member disk.

The Write Recovery Table (WRT) 450 used to remember the locations of unreadable data in a system drive is simple in structure and includes a list of Logical Block Addresses (LBAs). The WRT 450 is used to search locations of unreadable data during execution of a write request. During a read, the WRT 450 is bypassed, allowing the affected disk a chance to recover data. There is a probability that under certain circumstances what was unreadable may turn out readable.

For a RAID system that supports another apparatus known as Bad Data Table (BDT), the WRT 450 may optionally be combined with the BDT, so that only one table needs to be searched during a write operation. The BDT, as described, for example, in U.S. Pat. No. 5,913,927, is used to reject a Read Request from the host for a matched LBA (that is listed therein) because the data in the addressed block is known incorrect (it is a filler block). A BDT entry is cleared when a write involving a matched LBA occurs (since replacement data is available to reinstate the block validity). The BDT was originally created to list addresses of bad logical blocks encountered and arbitrarily re-written during a rebuild operation on a redundant array. It was later extended to non-redundant arrays as well, for example, to indicate an unrecovered read error at a certain LBA encountered during a capacity expansion of such array as RAID 0.

The combined table is referred to as Write Recovery-Bad data Table (WR-BDT) 500 and is illustrated in FIG. 5. The WR-BDT 500 lists LBAs 510 that represent data blocks that either contain bad data or require write recovery during a write, but not both. The WR-BDT 500 uses a Write Recovery Bit 520 to indicate whether or not the associated LBA 510 requires a write recovery during a write. FIG. 5 shows one example of the WR-BDT 500 for a certain logical drive configured as a non-redundant RAID array such as RAID 0. For RAID systems that already use a Bad Data Table (BDT), the Write Recovery Table (WRT) can be easily combined with the BDT by adding one bit (the Write Recovery bit) in each entry to the LBA. Consequently, during a write operation, only one table needs to be searched. On a read the table is searched only for the LBA specified in the Read request together with the associated Write Recovery bit being "0", as if a typical BDT had been used.

Figure 6:
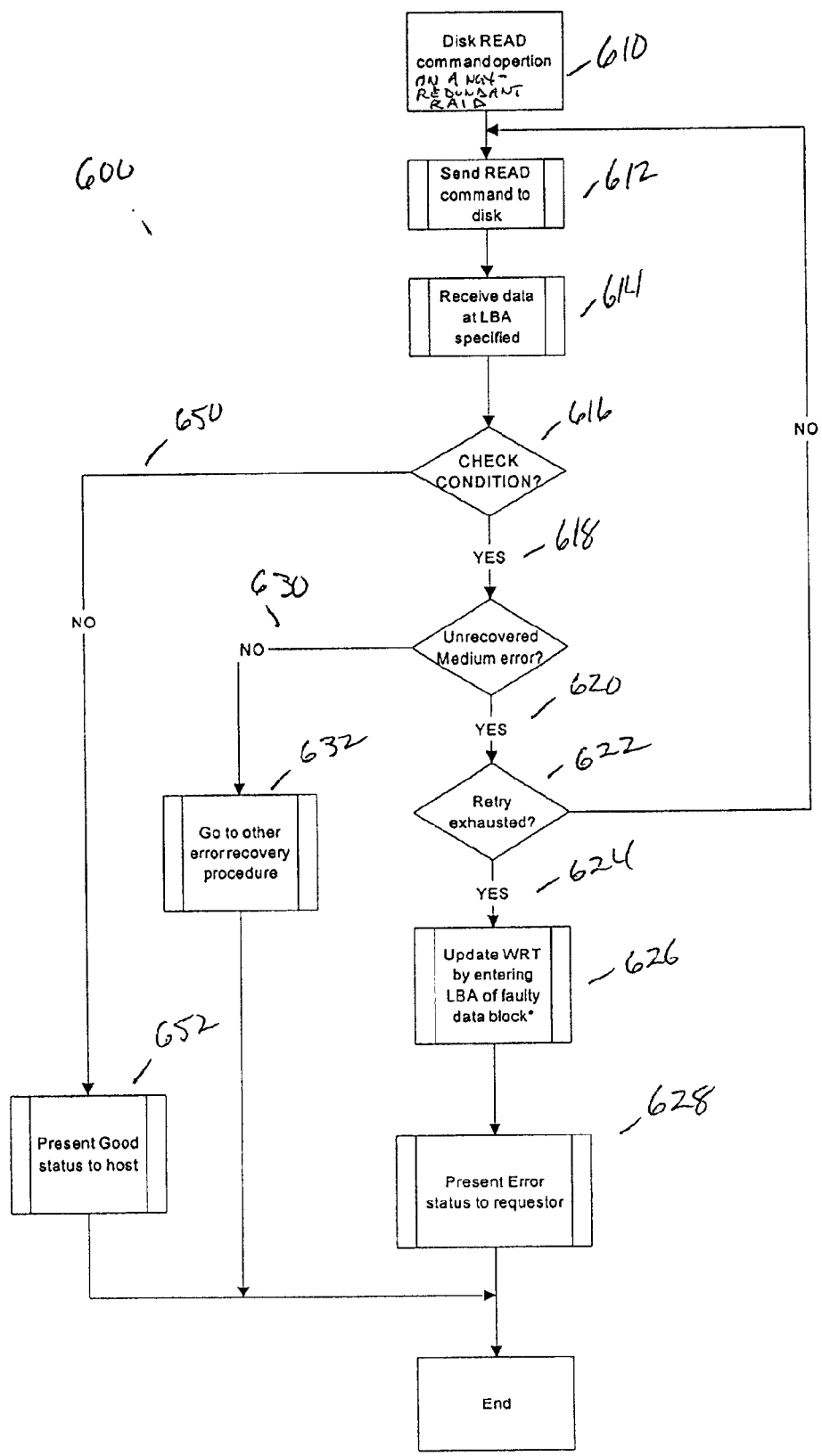
FIG. 6 is a flow chart illustrating the Read command operation according to the present invention.

FIG. 6 is a flow chart 600 illustrating the Read command operation according to the present invention. In FIG. 6, a Read request is issued by a host 610. In response to the Read request, a Read command operation on a non-redundant RAID array disk is issued by the RAID controller 612. The data at the designated LBA is returned 614. A determination is made whether a status indicating CHECK CONDITION is returned 616. If CHECK CONDITION is not returned 650, Good status is presented to the host 652. When the disk returns its status indicating CHECK CONDITION 618 and sense data indicating an unrecovered medium error 620, the RAID controller performs a pre-defined number of retries 622. The Logical Block Address (LBA) of the data block on the physical disk encountering such unrecovered read error is also specified in the disk sense data. When the retry is exhausted 624, if the disk still returns the same status and sense data, the RAID controller will determine the associated Logical Block Address (LBA) of the logical drive which encountered such error on the particular physical block. The RAID controller will enter such LBA in the WRT 626 (or WRT-BDT when combined and set the Write Recovery bit to 1, as indicated by *). The error status is then presented to the requestor 628. If the sense data does not indicate an unrecovered medium error 630, other error recovery procedures are attempted 632.

Figure 7:
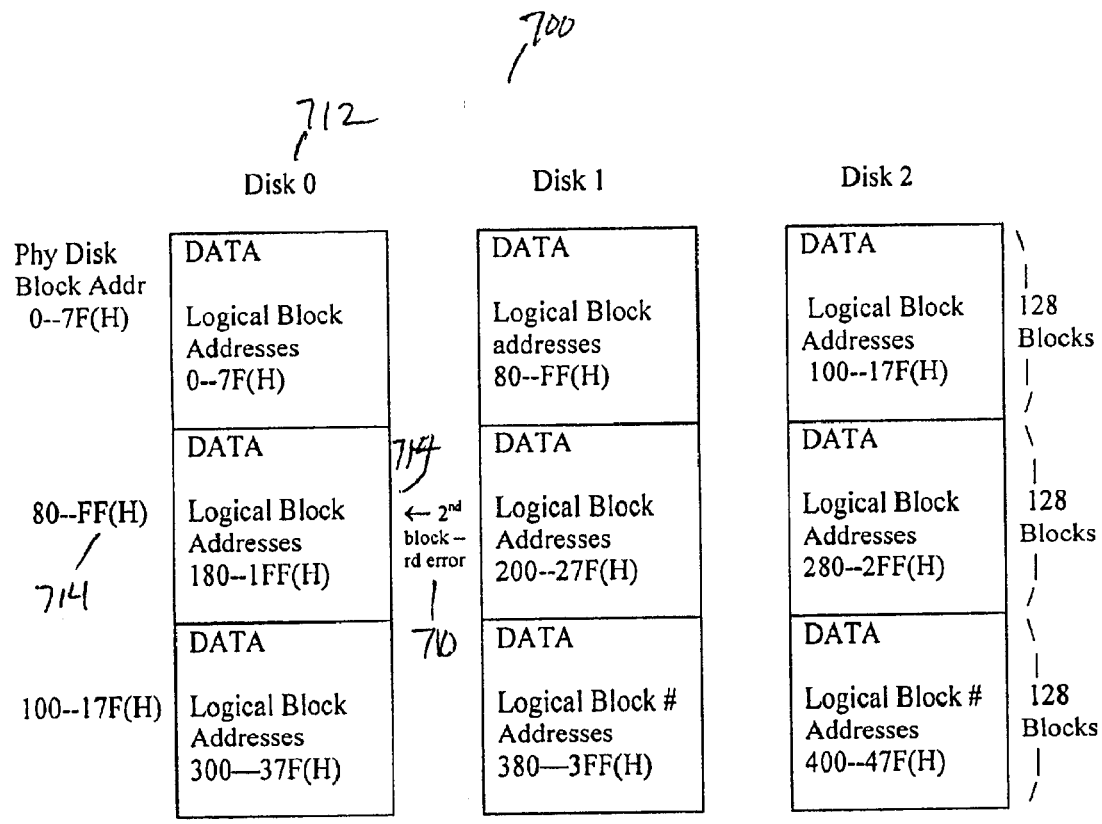
FIG. 7 illustrates the determination by the RAID controller of the LBA in a logical drive in error.

FIG. 7 illustrates the determination 700 by the RAID controller of the LBA in a logical drive in error. For example, of an unrecovered read error 710 in Disk 0 712 as shown, its physical block address of 81(H) 714 (such as indicated in drive sense data) is mapped to 181(H) for logical drive 0, which will be entered into the WRT.

Figure 8:
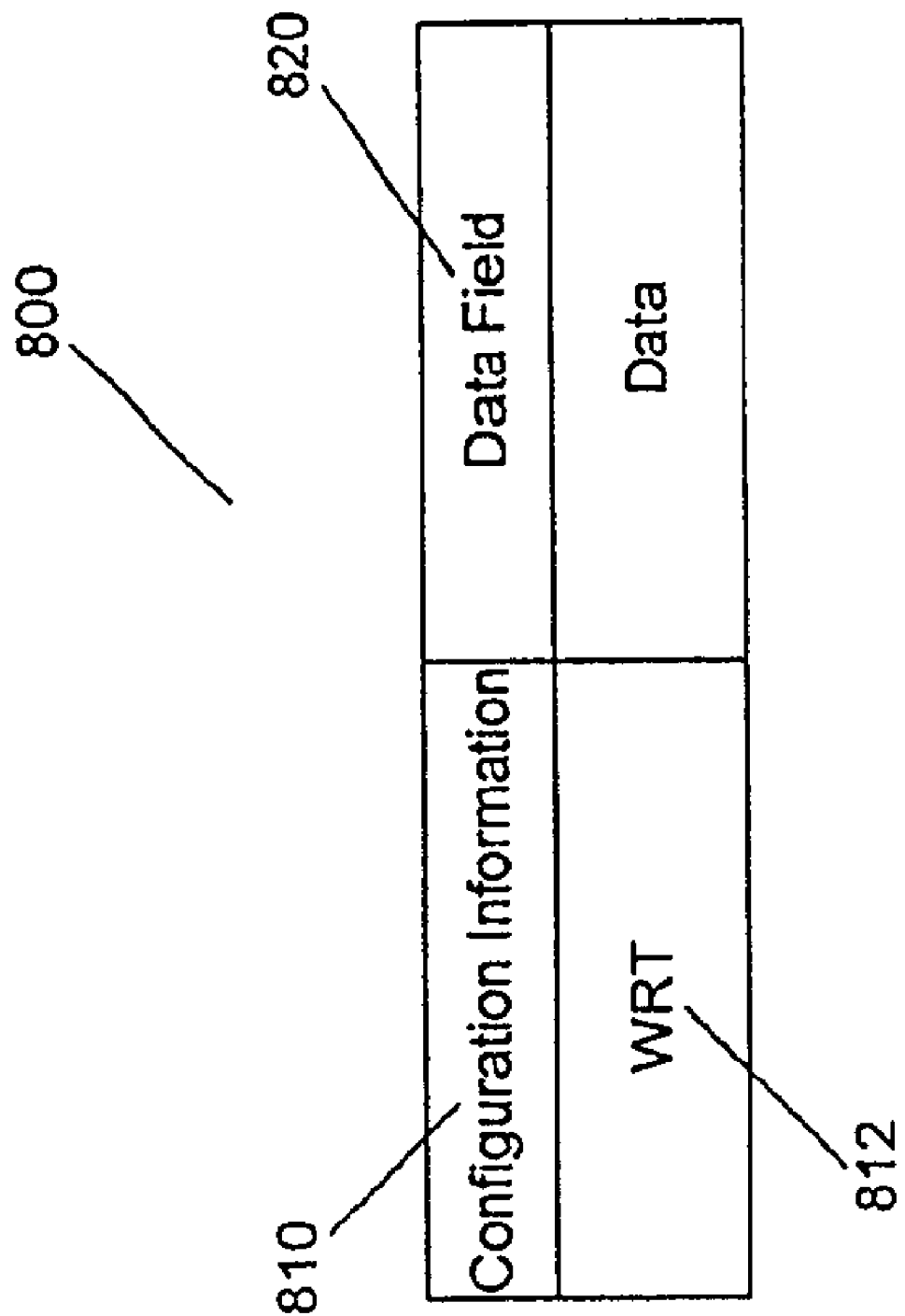
FIG. 8 illustrates a memory wherein the WRT is saved.

FIG. 8 illustrates a memory 800 wherein the WRT is saved, for example on disks of the array. For example, the memory 800 includes an area 810 where array configuration information is normally kept. The WRT 812 may be saved in this configuration information area 810. Thus, following a power cycle, the WRT 812 may be brought up from a disk to dynamic RAM for future reference. It should also be apparent that the memory 800 may also include the normal data storage area 820. Those skilled in the art will recognize that the memory can be a non-volatile storage device such as disks in the affected array. Typically, those disks already have an area allocated for some important RAID configuration information etc. The WRT can be a simple addition therein within a reasonable space constraint.

Figure 9:
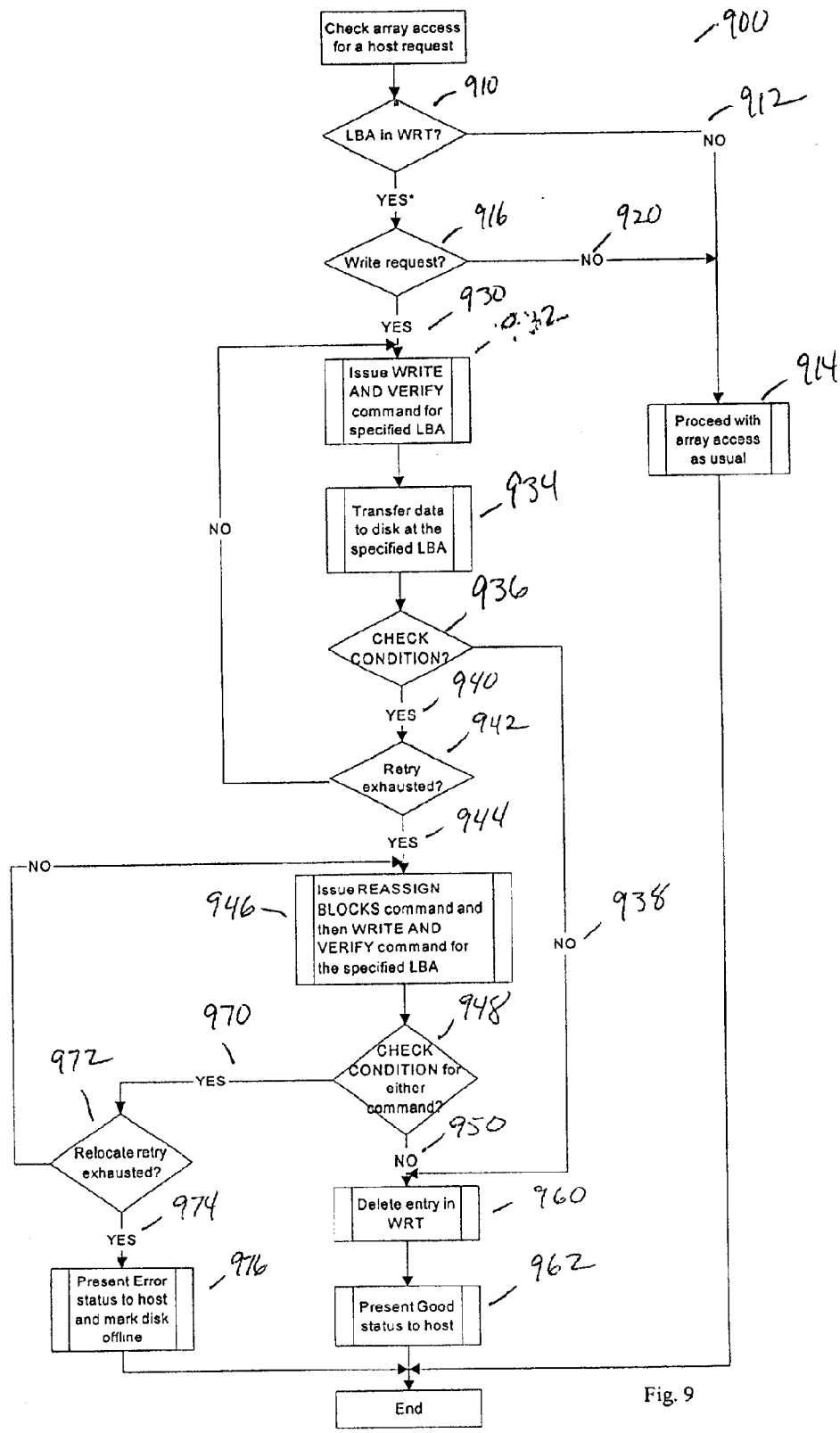
FIG. 9 illustrates a flow chart for checking array access according to the present invention.

FIG. 9 illustrates a flow chart 900 for checking array access according to the present invention. In FIG. 9, the WRT is searched on a Write or Read Request from the host to determine whether an LBA in the range specified by the request matches an entry in the WRT 910. If the LBA is not in the WRT 912, the system proceeds with the usual array access 914. In FIG. 9, the "*" indicates that if the combined WRBDT is used instead, a check is also made to see whether the Write Recovery bit is "1". If yes, proceed as shown in FIG. 9 and described from the following paragraph. Otherwise, the normal BDT process takes over, namely the entry is deleted before a WRITE command is issued to the disk, because valid data will be restored to the block which had known incorrect data (filler block), or if a Read Request is received, it will be rejected as the normal BDT dictates.

Next a determination is made as to whether the request is a Read Request 916. On a Read Request from the host 920, no such WRT search is made and the system proceeds with the usual array access 914. On a Write Request, when a match is found 930, the RAID controller can issue one WRITE AND VERIFY command for the entire range of LBAs instead of a WRITE command as in the prior art 932. The data is transferred to the disk at the specified LBA 934. Those skilled in the art will recognize that the RAID controller may also choose to break the LBA range in three segments when issuing commands for the Write Request: a WRITE command for the first segment up to the LBA matched against the WRT, a WRITE AND VERIFY command for the block that matches the WRT and a WRITE command for the remaining blocks.

Next a determination is made whether a CHECK CONDITION status is returned by the disk 936. If the WRITE AND VERIFY command is executed with a GOOD status returned by the disk 938, the associated WRT entry is deleted 960. If a CHECK CONDITION status is returned by the disk 940, the RAID controller can perform a pre-defined number of command retries 942.

If said command retries are not successful 944, the RAID controller issues a REASSIGN BLOCKS command specifying the error LBA 946, so that the disk will assign the particular data block to a spare sector somewhere on the disk and the RAID controller will then issue the WRITE AND VERIFY command for the block reassigned. A determination is made whether any errors are encountered during the execution of this procedure 948. If no errors are encountered during the execution of this procedure 950, the associated WRT entry is deleted 960. After the remaining blocks are properly written, the RAID controller will present a Good status to the host 962.

If during execution of either the REASSIGN BLOCKS or the WRITE AND VERIFY command, a CHECK CONDITION status is returned by the disk 970, the RAID controller will perform a number of retries pre-defined for this particular procedure 972. If unsuccessful 974, then the RAID controller will present an error status to the host, and mark the disk offline for servicing 976.

Figure 10:
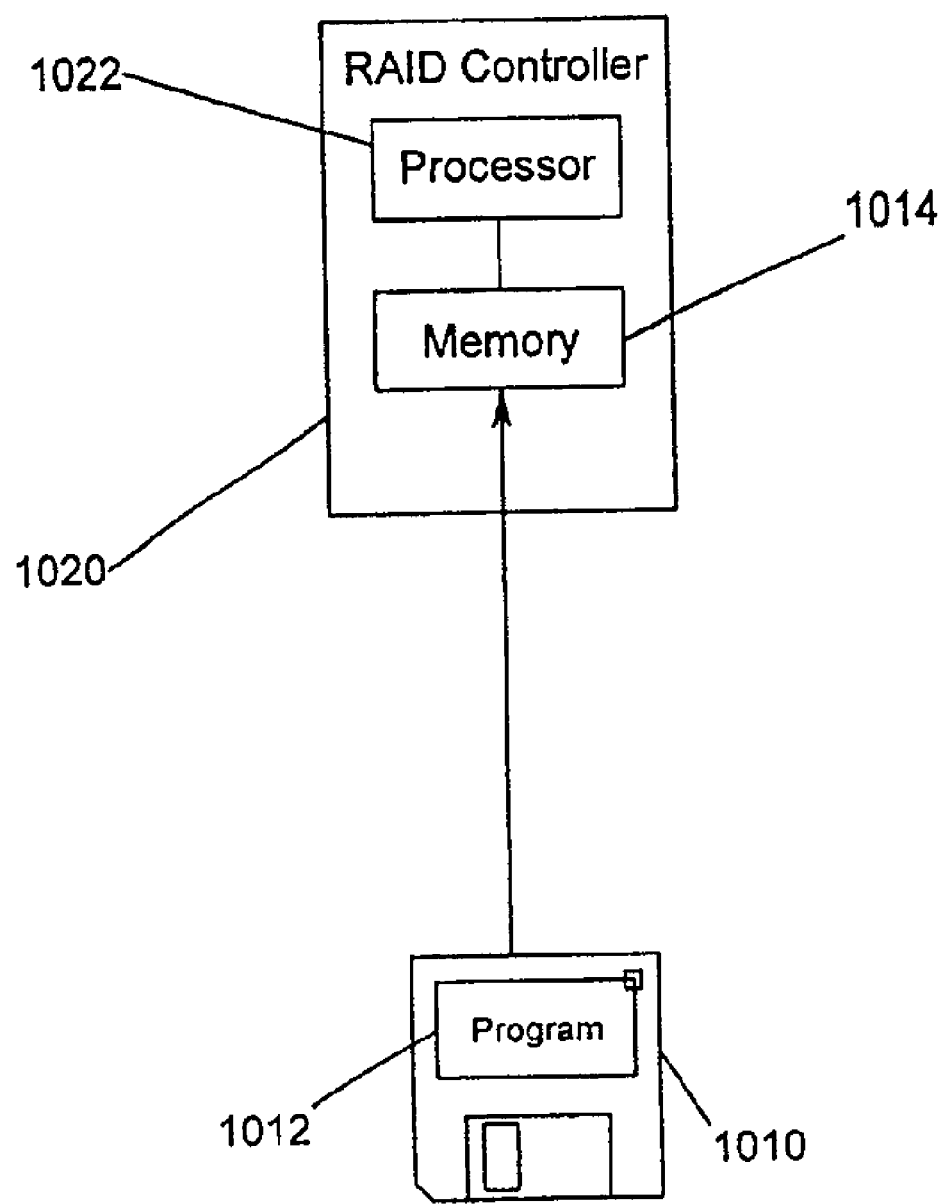
FIG. 10 is a block diagram that illustrates an exemplary hardware environment for providing write recovery of faulty data in a non-redundant array disk system according to the present invention.

The process illustrated with reference to FIGS. 4–9 may be tangibly embodied in a computer-readable medium or carrier, e.g. one or more of the fixed and/or removable data storage devices 1010, as illustrated in FIG. 10, or other data storage or data communications devices. A computer program 1012 on the storage device 1010 may be loaded into the memory 1014 or into the storage device 1010 to configure the RAID controller 1020 of FIG. 10, for execution. The computer program 1012 comprise instructions which, when read and executed by a processor 1022 of the RAID controller 1020 of FIG. 10, causes the RAID controller 1020 to perform the steps necessary to execute the steps or elements of the present invention.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method for handling write errors in a non-redundant disk array storage system, comprising:

issuing a command to write and verify data transfer when requested to write data to a specified location address that is stored in an error table; and reassigning the data to a new location address when the command to write and verify the data transfer is unsuccessful; and wherein the error table comprises a combined write recovery table and bad data table.

2. The method of claim 1 wherein the error table records error locations on a disk drive.

3. The method of claim 1 further comprising transferring the data to the specified location address when a good status is returned in response to the command to write and verify the data transfer.

4. The method of claim 1 wherein the command to write and verify the data transfer comprises a write/verify command.

5. The method of claim 1 wherein the command to write and verify the data transfer comprises a write command followed by a read command with the force unit access bit being set to 1 to force the data to be read from the disk drive rather than from disk drive cache.

6. The method of claim 1 wherein the command to write and verify the data transfer is unsuccessful only when a predetermined number of write and verify retries is exhausted.

7. A method for handling write errors in a non-redundant disk array storage system, comprising:
   issuing a command to write and verify data transfer when requested to write data to a specified location address that is stored in an error table;
   reassigning the data to a new location address when the command to write and verify the data transfer is unsuccessful;
   verifying the reassigning of data to a new location address;
   detecting an error for the reassigning;
   retrying the reassigning for a predetermined number of times; and
   returning a fatal error status and marking the disk offline when the predetermined number of times is exhausted.

8. The method of claim 1 further comprising deleting the specified location address that is stored in the error table when the reassign of data is successful.

9. The method of claim 1 further comprising deleting the specified location address that is stored in the error table when the command to write and verify the data transfer is successful.

10. A storage system, comprising:
   an array of storage devices; and
   a storage controller, coupled to the array of storage devices, the storage controller including a memory for maintaining an error table, the storage controller further being configured to issue a command to write and verify data transfer when requested to write data to a specified location address that is stored in an error table and reassign the data to a new location address when the command to write and verify the data transfer is unsuccessful; and wherein the error table comprises a combined write recovery table and bad data table.

11. The storage system of claim 10 wherein the error table records data error locations on a disk drive.

12. The storage system of claim 10 wherein the controller transfers the data to the specified location address when a good status is returned in response to the command to write and verify the data transfer.

13. The storage system of claim 10 wherein the command to write and verify the data transfer comprises a write/verify command.

14. The storage system of claim 10 wherein the command to write and verify the data transfer comprises a write command followed by a read command with the force unit access bit being set to 1 to force the data to be read from the storage device rather than from cache of the storage controller.

15. The storage system of claim 10 wherein the command to write and verify the data transfer is unsuccessful only when a predetermined number of write and verify retries is exhausted.

16. The storage system of claim 10 wherein the storage controller deletes the specified location address that is stored in the error table when the reassign of data is successful.

17. The storage system of claim 10 wherein the storage controller deletes the specified location address that is stored in the error table when the command to write and verify the data transfer is successful.

18. A storage system, comprising:
   an array of storage devices; and
   a storage controller, coupled to the array of storage controller including a memory for maintaining an error table, the storage controller further being configured to issue a command to write and verify data transfer when requested to write data to a specified location address that is stored in an error table and reassign the data to a new location address when the command to write and verify the data transfer is unsuccessful; and
   wherein the storage controller further verifies the reassigning of data to new location address, detects an error for the reassigning, retries the reassigning for a predetermined number of times, returns a fatal error status and marks the storage device offline when the predetermined number of times is exhausted.

19. An error table disposed in a storage controller, the error table configured with addresses for data error locations on a storage device so that for a write request, the storage controller knows to perform a write and verify command to transfer the data to the storage device and to verify the successful transfer of the data to the storage device; said error table further comprising a write recovery bit to indicate when an address associated therewith requires a write recovery during a write; and wherein the write recovery bit allows a bad data table to be combined with the write recovery table.

20. The error table of claim 19 wherein on a read the error table is searched only for an address specified in a read request together with an associated write recovery bit being set to 0.

21. A computer program product for handling write errors in a non-redundant disk array storage system, said program product comprising:
   a computer readable medium;
   first program instructions to issue a command to write and verify data transfer when requested to write data to a specified location address that is stored in an error table;
   second program instructions to reassign the data to a new location address when the command to write and verify the data transfer is unsuccessful;
   third program instructions to verify the reassignment of data to a new location address;
   fourth program instructions to detect an error for said reassignment;
   fifth program instructions to retry said reassignment for a predetermined number of times; and
   sixth program instructions to return a fatal error status and mark the disk offline when the predetermined number of times is exhausted; and wherein
   said first, second, third, fourth, fifth and sixth program instructions are recorded on said medium.

* * * * *